(12) United States Patent
Kaneko et al.

(10) Patent No.: US 10,471,389 B2
(45) Date of Patent: *Nov. 12, 2019

(54) METHOD FOR PRODUCING DEUTERIUM DEPLETED WATER, METHOD FOR SEPARATING HEAVY WATER AND LIGHT WATER, AND METHOD FOR PRODUCING DEUTERIUM CONCENTRATED WATER

(71) Applicants: SHINSHU UNIVERSITY, Nagano (JP); KOTOBUKI TSUSHOU CO., LTD., Fukuoka (JP)

(72) Inventors: Katsumi Kaneko, Nagano (JP); Toshio Takagi, Fukuoka (JP); Katsuyuki Murata, Fukuoka (JP); Ryusuke Futamura, Nagano (JP)

(73) Assignees: SHINSU UNIVERSITY, Nagano (JP); KOTOBUKI TSUSHOU CO., LTD., Fukuoka (JP)

( * ) Notice: Subject to any disclaimer, the term of this patent is extended or adjusted under 35 U.S.C. 154(b) by 119 days.

This patent is subject to a terminal disclaimer.

(21) Appl. No.: 15/561,871

(22) PCT Filed: Mar. 22, 2016

(86) PCT No.: PCT/JP2016/058911
§ 371 (c)(1),
(2) Date: Sep. 26, 2017

(87) PCT Pub. No.: WO2016/158549
PCT Pub. Date: Oct. 6, 2016

(65) Prior Publication Data
US 2018/0111090 A1 Apr. 26, 2018

(30) Foreign Application Priority Data
Mar. 31, 2015 (JP) .................. 2015-072289

(51) Int. Cl.
*B01D 53/02* (2006.01)
*B01D 59/26* (2006.01)
(Continued)

(52) U.S. Cl.
CPC ........... *B01D 59/26* (2013.01); *B01D 53/047* (2013.01); *C01B 5/00* (2013.01); *C01B 5/02* (2013.01);
(Continued)

(58) Field of Classification Search
CPC ........ B01D 2253/102; B01D 2253/108; B01D 2257/80; B01D 53/047; B01D 53/0476;
(Continued)

(56) References Cited

U.S. PATENT DOCUMENTS 3,399,967 A * 9/1968 Pogorski ................ C01B 5/02
423/580.1
3,698,156 A * 10/1972 Dirian ................ B01D 59/26
95/86
(Continued)

FOREIGN PATENT DOCUMENTS

CN 1834002 9/2006
CN 101117210 2/2008
(Continued)

OTHER PUBLICATIONS

Office Action in Chinese Patent Application No. 201680015983.3 dated Jan. 3, 2019, 5 pages.
(Continued)

*Primary Examiner* — Christopher P Jones
(74) *Attorney, Agent, or Firm* — Haynes and Boone, LLP

(57) ABSTRACT

Utilizing the fact that a predetermined adsorbent adsorbs light water at an initial desorption rate higher than heavy water and semi-heavy water, deuterium depleted water having a reduced concentration of heavy water and semi-heavy water is produced easily and in a short time.

(Continued)

A method for producing deuterium depleted water by removing heavy water and semi-heavy water from water, the method including: a desorption process in which a relative pressure around a predetermined adsorbent with adsorbed water vapor is reduced, and in which water vapor desorbed from the adsorbent is recovered during a period of time when a desorption rate of light water>a desorption rate of the heavy water and semi-heavy water.

5 Claims, 10 Drawing Sheets

(51) Int. Cl.
  *B01D 53/047* (2006.01)
  *C01B 5/00* (2006.01)
  *C01B 5/02* (2006.01)
(52) U.S. Cl.
  CPC .. *B01D 2253/102* (2013.01); *B01D 2253/108* (2013.01); *B01D 2257/80* (2013.01)
(58) Field of Classification Search
  CPC . B01D 59/26; B01J 20/20; C01B 5/00; C01B 5/02
  See application file for complete search history.

(56) References Cited

U.S. PATENT DOCUMENTS

| | | | | |
|---|---|---|---|---|
| 3,700,417 | A | * | 10/1972 | Broughton ......... B01D 15/1821 210/689 |
| 4,915,929 | A | | 4/1990 | Thiel |
| 5,441,715 | A | * | 8/1995 | Gamo ................. B01D 59/26 423/249 |
| 7,659,430 | B2 | | 2/2010 | Woelfert et al. |
| 2012/0042688 | A1 | * | 2/2012 | Avery ................. B01D 53/261 62/532 |
| 2012/0097532 | A1 | * | 4/2012 | DeLuze ................ G21B 3/006 204/278 |
| 2017/0165590 | A1 | * | 6/2017 | Nakamura ............ B01D 59/08 |
| 2018/0111090 | A1 | * | 4/2018 | Kaneko ................ B01D 59/26 |

FOREIGN PATENT DOCUMENTS

| | | |
|---|---|---|
| CN | 201493052 | 6/2010 |
| CN | 102515100 | 6/2012 |
| CN | 103803494 | 5/2014 |
| DE | 2434876 | 4/1975 |
| EP | 3278864 | 2/2008 |
| JP | S5334098 A | 3/1978 |
| JP | S6268530 A | 3/1987 |
| JP | H5-031331 | 2/1993 |
| JP | H5-155601 | 6/1993 |
| JP | 10-128072 A | 5/1998 |
| JP | 2012-005920 A | 1/2012 |
| JP | 2012-158499 A | 8/2012 |
| KR | 100736020 | 6/2007 |

OTHER PUBLICATIONS

Search Report issued in European Patent Application No. 16772430.1, dated Oct. 16, 2018, 6 pgs.
International Preliminary Report on Patentability (IPRP) issued in WO Patent Application No. PCT/JP2015/058911, dated Oct. 5, 2017, 5 pgs.
English Translation of the International Search Report issued by the Japan Patent Office regarding International Application No. PCT/JP2016/058911, dated Jun. 14, 2016, 2 pages.
International Search Report and Written Opinion issued by the Japan Patent Office regarding International Application No. PCT/JP2016/058911, dated Jun. 14, 2016, 9 pages.
Iwai Yasunori, Application of Pressure Swing Adsorption to Water Detritiation Process, Journal of Nuclear Science and Technology, Jun. 25, 2005, vol. 42, No. 6, p. 566-572.
Xiao-Zhong, Dynamic experiments and model of hydrogen and deuterium separation with micropore molecular sieve Y at 77K, Chemical Engineering Journal, 2009, vol. 152, p. 428-433).
Fitzgerald, Highly Selective Quantum Sieving of $D_2$ from $H_2$ by a Metal-Organic Framework as Determined by Gas Manometry and Infrared Spectroscopy, J. Am. Chem. Soc., 2013, vol. 135, p. 9458-9464.
English Translation of the International Search Report issued by the Japan Patent Office regarding International Application No. PCT/JP2015/074154, dated Nov. 17, 2015, 1 page.
Written Opinion issued by the Japan Patent Office regarding International Application No. PCT/JP2015/074154, dated Nov. 17, 2015, 7 pages.
International Preliminary Examination Report issued by the Japan Patent Office regarding International Application No. PCT/JP2015/074154, dated Aug. 1, 2016, 11 pages.
International Preliminary Report on Patentability issued in WO Patent Application No. PCT/JP2015/074154, dated Mar. 2, 2017, 6 pgs.
Search Report issued in EP Patent Application No. 15835066.0, dated Mar. 6, 2018.
Office Action in Taiwan Patent Application No. 104127130, filed Jun. 22, 2018.
Notice of Allowance in Taiwan Patent Application No. 107132073, dated Jan. 9, 2019.
Notice of Allowance in U.S. Appl. No. 15/505,287, dated Mar. 27, 2019.

* cited by examiner

|  | CONCENTRATION AND QUANTITY OF WATER TO BE RECOVERED (ppm) ( per 1g ) | | CONCENTRATION AND QUANTITY OF WATER REMAINING IN TOWER (ppm) ( per 1g ) | |
|---|---|---|---|---|
| FIRST CYCLE | 135 | 74mg | 150 | |
| SECOND CYCLE | 121 | 5.5mg | 144 | 68mg |
| THIRD CYCLE | 109 | 0.41mg | 130 | 5.1mg |
| FOURTH CYCLE | 98 | 30μg | 117 | 0.38mg |
| FIFTH CYCLE | 88 | 2.2μg | 105 | 28μg |

FIG. 5

|  | 1st CYCLE | 2nd CYCLE | 3rd CYCLE | 15th CYCLE | 12th CYCLE REMAINING IN TOWER |
|---|---|---|---|---|---|
| FIRST TOWER | 135 ppm | 135 ppm | 135 ppm | 136 ppm | 150 ppm |
| SECOND TOWER | 121 ppm | 122 ppm | 123 ppm | 130 ppm | 144 ppm |
| THIRD TOWER | 109 ppm | 110 ppm | 111 ppm | 121 ppm | 133 ppm |
| FOURTH TOWER | 98 ppm | 99 ppm | 99 ppm | 111 ppm | 120 ppm |
| FIFTH TOWER | 88 ppm | 88 ppm | 89 ppm | 100 ppm | 108 ppm |

FIG. 7

|  | CONCENTRATION AND QUANTITY OF WATER TO BE RECOVERD | | CONCENTRATION AND QUANTITY OF WATER REMAINING IN TOWER | |
|---|---|---|---|---|
|  | (ppm) | ( per 1g ) | (ppm) | ( per 1g ) |
| FIRST CYCLE | 136 | 333mg | 150 |  |
| SECOND CYCLE | 123 | 111mg | 136 | 222mg |
| THIRD CYCLE | 111 | 37mg | 123 | 74mg |
| FOURTH CYCLE | 101 | 12mg | 111 | 25mg |
| FIFTH CYCLE | 91 | 4.1mg | 101 | 8.2mg |

| | 1st CYCLE | 2nd CYCLE | 3rd CYCLE | 3rd CYCLE REMAINING IN TOWER |
|---|---|---|---|---|
| FIRST TOWER | 136 ppm | 136 ppm | 136 ppm | 150 ppm |
| SECOND TOWER | 123 ppm | 129 ppm | 132 ppm | 146 ppm |
| THIRD TOWER | 111 ppm | 119 ppm | 125 ppm | 138 ppm |
| FOURTH TOWER | 101 ppm | 109 ppm | 116 ppm | 128 ppm |
| FIFTH TOWER | 91 ppm | 99 ppm | 108 ppm | 118 ppm |

METHOD FOR PRODUCING DEUTERIUM DEPLETED WATER, METHOD FOR SEPARATING HEAVY WATER AND LIGHT WATER, AND METHOD FOR PRODUCING DEUTERIUM CONCENTRATED WATER

CROSS REFERENCE

This application is a United States national phase application of co-pending international patent application number PCT/JP2016/058911, filed Mar. 22, 2016, which claims priority to Japanese patent application number 2015-072289, filed Mar. 31, 2015, the entire disclosures of which are hereby incorporated herein by reference.

TECHNICAL FIELD

The present invention relates to a method for producing deuterium depleted water in which a quantity of heavy water or semi-heavy water is reduced from commonly used water.

The present invention also relates to a method for separating heavy water and semi-heavy water from light water, and a method for producing deuterium concentrated water containing a large quantity of heavy water or semi-heavy water.

BACKGROUND ART

Commonly used water is a mixture of $H_2O$ (light water); and $D_2O$ (heavy water) and DHO (semi-heavy water) which are water molecules containing a deuterium atom, an isotope of a hydrogen atom. A concentration of heavy water and semi-heavy water contained in water of nature differs depending on places to be collected, but in level grounds, the concentration is about 150 ppm, most of which are semi-heavy water.

A quantity of heavy water and semi-heavy water in an adult weighing 60 kg is, for example, as minute as 95 ppm. However, heavy water and semi-heavy water are different from light water in physical properties such as solubility, electrical conductivity, and ionization degree of substances as well as a reaction speed of the substances. Therefore, high intake of heavy water or semi-heavy water causes malfunctions in biological reactions, and pure heavy water annihilates living organisms. Accordingly, it is said that a lower deuterium concentration in drinking water and the like is preferable for human health, which is now being studied.

Deuterium depleted water containing almost no heavy water or semi-heavy water is not approved by the Japanese Ministry of Health, Labor and Welfare, but is approved in Hungary as an anticancer drug for animals, and is taken by many cancer patients and the like.

To produce deuterium depleted water from commonly used water, the following techniques have been known in the related art, that is, repeated distillation utilizing a slight difference in physical property between hydrogen and deuterium (Patent Literature 1), and a water electrolysis method (Patent Literature 2).

However, the conventional methods for producing deuterium depleted water require large-scale equipment, and repetition of complicated operations, which leads to high manufacturing costs. Such reasons impose large economic burdens on cancer patients and those who take deuterium depleted water in anticipation of various efficacy.

CITATION LIST

Patent Literature

Patent Literature 1: JP 2008-512338 W
Patent Literature 2: JP 2012-158499 A

SUMMARY OF INVENTION

Technical Problem

The present invention has been made to solve the above problem, and an object of the present invention is to produce deuterium depleted water easily in a short time.

Another object of the present invention is to produce deuterium concentrated water containing a large quantity of heavy water or semi-heavy water with ease at low cost.

Solution to Problem

In the present invention, means for solving the above problem are as follows.

A first aspect of the present invention is a method for producing deuterium depleted water by removing heavy water and semi-heavy water from water, the method including: a desorption process in which a relative pressure of water vapor around a predetermined adsorbent with adsorbed water vapor is reduced, and in which water vapor desorbed from the adsorbent is recovered during a period of time when a desorption rate of light water>a desorption rate of the heavy water and semi-heavy water.

Note that the above method can be employed even when recovering and utilizing water containing a large quantity of heavy water or semi-heavy water.

A second aspect of the present invention is a method for producing deuterium depleted water by removing heavy water and semi-heavy water from water, the method including: a desorption process in which a relative pressure of water vapor around a predetermined adsorbent with adsorbed water vapor is reduced, and in which water vapor desorbed from the adsorbent is recovered only during a period of time when a desorption rate of light water>a desorption rate of the heavy water and semi-heavy water.

A third aspect of the present invention is a method for producing deuterium depleted water by removing heavy water and semi-heavy water from water, the method including: a desorption process in an upper stream in which two or more predetermined adsorbents are arranged in series in advance so as to reduce a relative pressure of water vapor around an adsorbent in the upper stream with adsorbed water vapor and to recover water vapor desorbed from the adsorbent in the upper stream during a period of time when a desorption rate of light water>a desorption rate of the heavy water and semi-heavy water; and a desorption process in a lower stream in which an adsorbent in the lower stream is allowed to adsorb the recovered water vapor so as to reduce a relative pressure of water vapor around the adsorbent in the lower stream and to recover water vapor desorbed from the adsorbent in the lower stream during the period of time when the desorption rate of the light water>the desorption rate of the heavy water and semi-heavy water.

Note that the process of recovering water vapor in the desorption process in the upper stream, and the process of allowing the adsorbent in the lower stream to adsorb the recovered water vapor in the desorption process in the lower stream may be carried out simultaneously.

The above method can be employed even when recovering and utilizing water containing a large quantity of heavy water or semi-heavy water.

A fourth aspect of the present invention is a method for producing deuterium depleted water by removing heavy water and semi-heavy water from water, the method including: an adsorption process in which water vapor is supplied to a predetermined adsorbent, and in which the adsorbent is allowed to adsorb water vapor during a period of time when an adsorption rate of light water>an adsorption rate of heavy water and semi-heavy water so as to recover the water vapor from the adsorbent.

Note that the above method can be employed even when recovering and utilizing water containing a large quantity of heavy water or semi-heavy water.

A fifth invention is a method for separating water into light water, heavy water, and semi-heavy water, the method including: reducing a relative pressure of water vapor around a predetermined adsorbent with adsorbed water vapor; and desorbing water vapor from the adsorbent during a period of time when a desorption rate of the light water>a desorption rate of the heavy water and semi-heavy water.

A sixth aspect of the present invention is a method for separating water into light water, heavy water, and semi-heavy water, the method including: supplying water vapor to a predetermined adsorbent; and allowing the adsorbent to adsorb water vapor during a period of time when an adsorption rate of the light water>an adsorption rate of the heavy water and semi-heavy water.

A seventh aspect of the present invention is a method for producing deuterium concentrated water by removing light water from water, the method including: a desorption process in which a relative pressure of water vapor around a predetermined adsorbent with adsorbed water vapor is reduced, and in which water vapor is desorbed from the adsorbent during a period of time when a desorption rate of the light water>a desorption rate of heavy water and semi-heavy water, thereafter recovering water remaining in the adsorbent.

An eighth aspect of the invention is a method for producing deuterium concentrated water by removing light water from water, the method including: an adsorption process in which water vapor is supplied to a predetermined adsorbent, and in which the adsorbent is allowed to adsorb the water vapor during a period of time when an adsorption rate of the light water>an adsorption rate of heavy water and semi-heavy water, thereafter recovering water vapor which is not adsorbed by the adsorbent.

Advantageous Effects of Invention

According to the first aspect of the present invention, there is provided a method for producing deuterium depleted water by removing heavy water and semi-heavy water from water, the method including: a desorption process in which a relative pressure of water vapor around a predetermined adsorbent with adsorbed water vapor is reduced, and in which water vapor desorbed from the adsorbent is recovered during a period of time when a desorption rate of light water>a desorption rate of the heavy water and semi-heavy water. Therefore, compared to the related art, it is possible to produce deuterium depleted water easily and in a short time with a simple device.

Furthermore, water remaining in the adsorbent contains a large quantity of concentrated heavy water and semi-heavy water so that this water can also be used.

According to the second aspect of the present invention, there is provided a method for producing deuterium depleted water by removing heavy water and semi-heavy water from water, the method including: a desorption process in which a relative pressure of water vapor around a predetermined adsorbent with adsorbed water vapor is reduced, and in which water vapor desorbed from the adsorbent is recovered only during a period of time when a desorption rate of light water>a desorption rate of the heavy water and semi-heavy water. Therefore, it is possible to produce deuterium depleted water having a further reduced deuterium concentration.

Furthermore, water remaining in the adsorbent contains a large quantity of concentrated heavy water and semi-heavy water so that this water can also be used.

According to a third aspect of the present invention, there is provided a method for producing deuterium depleted water by removing heavy water and semi-heavy water from water, the method including: a desorption process in an upper stream in which two or more predetermined adsorbents are arranged in series in advance so as to reduce a relative pressure of water vapor around an adsorbent in the upper stream with adsorbed water vapor and to recover water vapor desorbed from the adsorbent in the upper stream during a period of time when a desorption rate of light water>a desorption rate of the heavy water and semi-heavy water; and a desorption process in a lower stream in which an adsorbent in the lower stream is allowed to adsorb the recovered water vapor so as to reduce a relative pressure of water vapor around the adsorbent in the lower stream and to recover water vapor desorbed from the adsorbent in the lower stream during the period of time when the desorption rate of the light water>the desorption rate of the heavy water and semi-heavy water. Therefore, it is possible to produce deuterium depleted water having a further reduced deuterium concentration easily and at a short time.

Furthermore, water remaining in the adsorbent contains a large quantity of concentrated heavy water and semi-heavy water so that this water can also be used.

According to a fourth aspect of the present invention, there is provided a method for producing deuterium depleted water by removing heavy water and semi-heavy water from water, the method including: an adsorption process in which water vapor is supplied to a predetermined adsorbent, and in which the adsorbent is allowed to adsorb water vapor during a period of time when an adsorption rate of light water>an adsorption rate of the heavy water and semi-heavy water so as to recover the water vapor from the adsorbent. Therefore, compared to the related art, it is possible to produce deuterium depleted water easily and in a short time with a simple device.

According to the fifth invention of the present invention, a relative pressure of water vapor around a predetermined adsorbent with adsorbed water vapor is reduced, and water vapor is desorbed from the adsorbent during a period of time when a desorption rate of light water>a desorption rate of heavy water and semi-heavy water. Therefore, compared to the related art, it is possible to separate the light water from the heavy water and semi-heavy water easily and at low cost with a simple device.

According to the sixth aspect of the present invention, water vapor is supplied to a predetermined adsorbent, and the adsorbent is allowed to adsorb water vapor during a period of time when an adsorption rate of light water>an adsorption rate of heavy water and semi-heavy water. Therefore, compared to the related art, it is possible to separate the light water from the heavy water and semi-heavy water easily and at low cost with a simple device.

According to the seventh aspect of the present invention, there is provided a method including: a desorption process in which a relative pressure of water vapor around a predetermined adsorbent with adsorbed water vapor is reduced, and in which water vapor is desorbed from the adsorbent during a period of time when a desorption rate of the light water>a desorption rate of heavy water and semi-heavy water, thereafter recovering water remaining in the adsorbent. Therefore, compared to the related art, it is possible to produce deuterium concentrated water easily and at low cost with a simple device.

According to the eighth aspect of the present invention, there is provided a method including: an adsorption process in which water vapor is supplied to a predetermined adsorbent, and in which the adsorbent is allowed to adsorb the water vapor during a period of time when an adsorption rate of light water>an adsorption rate of heavy water and semi-heavy water, thereafter recovering water vapor which is not adsorbed by the adsorbent. Therefore, compared to the related art, it is possible to produce deuterium concentrated water easily and at low cost with a simple device.

BRIEF DESCRIPTION OF DRAWINGS

FIG. 5 is a table illustrating results of a second embodiment of the present invention.

FIG. 7 is a table illustrating results of the third embodiment of the present invention.

FIG. 9 is a table illustrating results of a sixth embodiment of the present invention.

FIG. 10 is a table illustrating results of a seventh embodiment of the present invention.

DESCRIPTION OF EMBODIMENTS

Hereinafter, a method for producing deuterium depleted water according to an embodiment of the present invention will be described.

The present invention utilizes the fact that a predetermined adsorbent adsorbs light water at initial adsorption/desorption rates higher than heavy water and semi-heavy water.

<Measurement of Adsorption Rates and Desorption Rates>

Figure 1:
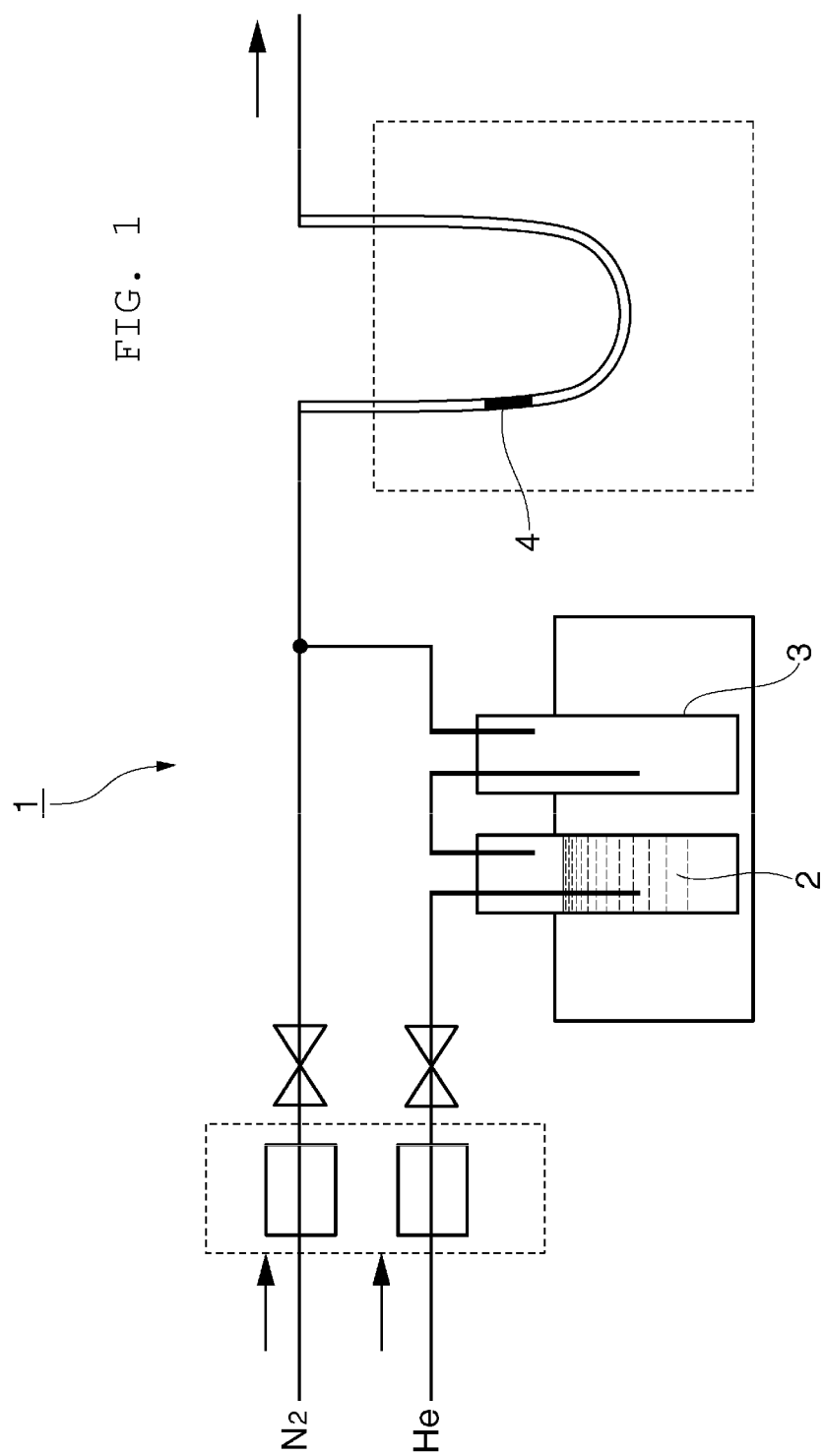
FIG. 1 is a view illustrating a measurement device to measure adsorption rates and desorption rates of light water and heavy water with respect to an adsorbent.

Adsorption rates and desorption rates of light water, heavy water, and semi-heavy water with respect to an adsorbent are measured with a measurement device illustrated in FIG. 1.

In this measurement device 1, helium gas is used as a carrier of water vapor. Although helium gas is used herein, types of the carrier are not limited as long as they can be used as a carrier of water vapor.

First, helium gas is ejected into water 2 so as to recover the gas that has risen. Next, this helium gas is allowed to pass an empty test tube 3 so as to drop excess water droplets, and the gas is recovered again.

Accordingly, helium gas containing water vapor is obtained.

This helium gas is mixed with dry nitrogen gas supplied from another system so as to control a humidity (relative pressure of water vapor) of the mixed gas.

This mixed gas is allowed to pass through a tube in which 35.5 mg of an adsorbent 4 is disposed so as to change the humidity of the mixed gas. Accordingly, the adsorption rates and desorption rates of the light water and the heavy water with respect to the adsorbent are measured. A supply rate of the mixed gas is set so that a total of the helium gas containing water vapor and the dry nitrogen gas becomes 50 ml/min. The entire measurement device 1 is maintained at 15° C.

Examples of the adsorbent 4 include carbon-based adsorbents such as activated carbon, activated carbon fiber, and carbon nanotube as well as inorganic porous materials such as silica gel and zeolite.

Among these examples, AlPO-based zeolite materials such as AQSOA (registered trademark) and ALPO-5 are excellent in adsorption performance, and activated carbon is low in cost.

Hereinafter, description will be made based on an example using activated carbon (activated carbon fiber "A-20" manufactured by AD'ALL Co., Ltd.) as an adsorbent.

In order to measure the adsorption rates, first, a mixture ratio of the mixed gas is adjusted, and a mixed gas with a humidity of 40% is supplied to the adsorbent 4 for a certain period of time. Next, a mixed gas with a humidity of 90% is supplied to the adsorbent 4 so as to obtain changes in quantity of the light water and the heavy water in the mixed gas recovered downstream of the adsorbent. Based on the changes in quantity, the adsorption rate of each water is measured.

Figure 2:
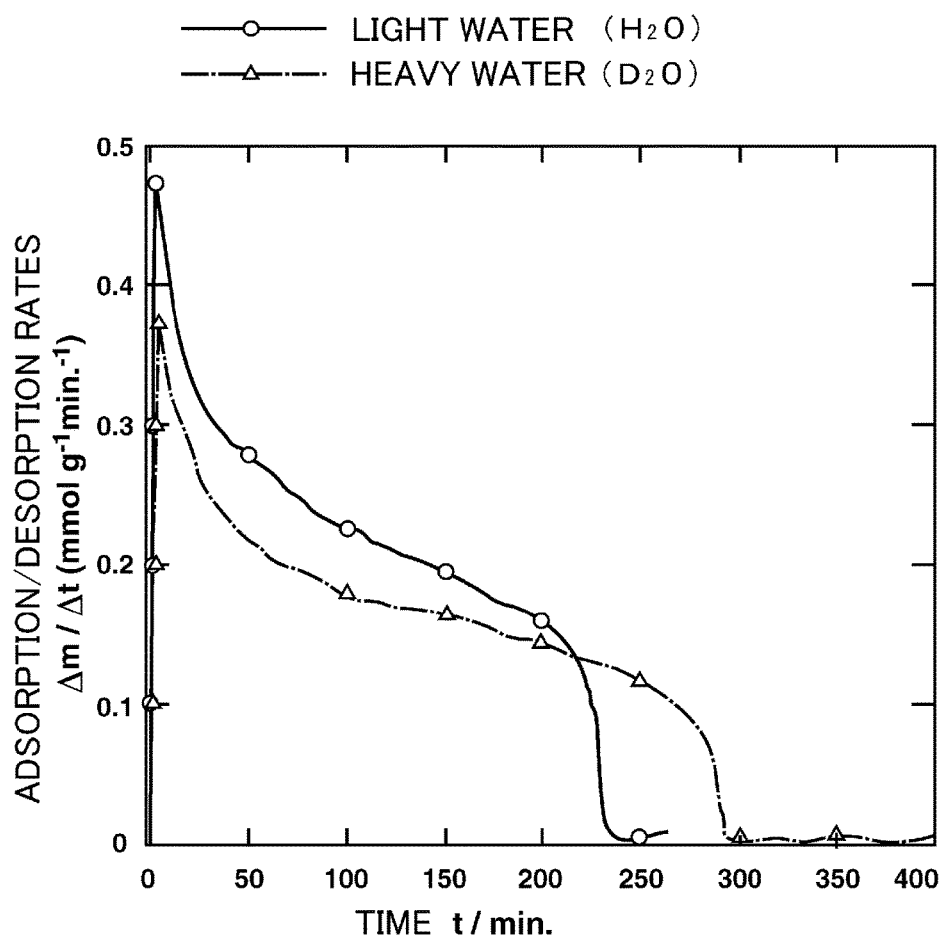
FIG. 2 is a graph illustrating the adsorption rates of the light water and the heavy water with respect to the adsorbent.

The graph in FIG. 2 illustrates the result.

As illustrated in FIG. 2, the adsorption rate of the light water is extremely high and greatly exceeds the adsorption rate of the heavy water for about 10 minutes after the start of supply of the mixed gas with the humidity of 90% (0 minute).

From 40 minutes to 220 minutes, the adsorption rate of the light water is moderate and exceeds the adsorption rate of the heavy water.

After 220 minutes, the adsorption rate of the light water drops sharply and falls below the adsorption rate of the heavy water.

The light water reaches equilibrium in approximately 230 minutes, and the heavy water reaches equilibrium in approximately 290 minutes.

Note that the adsorption rate of the semi-heavy water is considered to be a mean value of the adsorption rates of the light water and the heavy water.

In order to measure the desorption rates, a mixing ratio of the mixed gas is adjusted, and a mixed gas with a humidity of 90% is supplied to the adsorbent 4 for a certain period of time so as to allow the adsorbent 4 to adsorb water vapor. Next, a mixed gas with a humidity of 40% is supplied to the adsorbent 4 so as to obtain changes in quantity of the light water and the heavy water in the mixed gas recovered downstream of the adsorbent. Based on the changes in quantity, the desorption rate of each water is measured.

Figure 3:
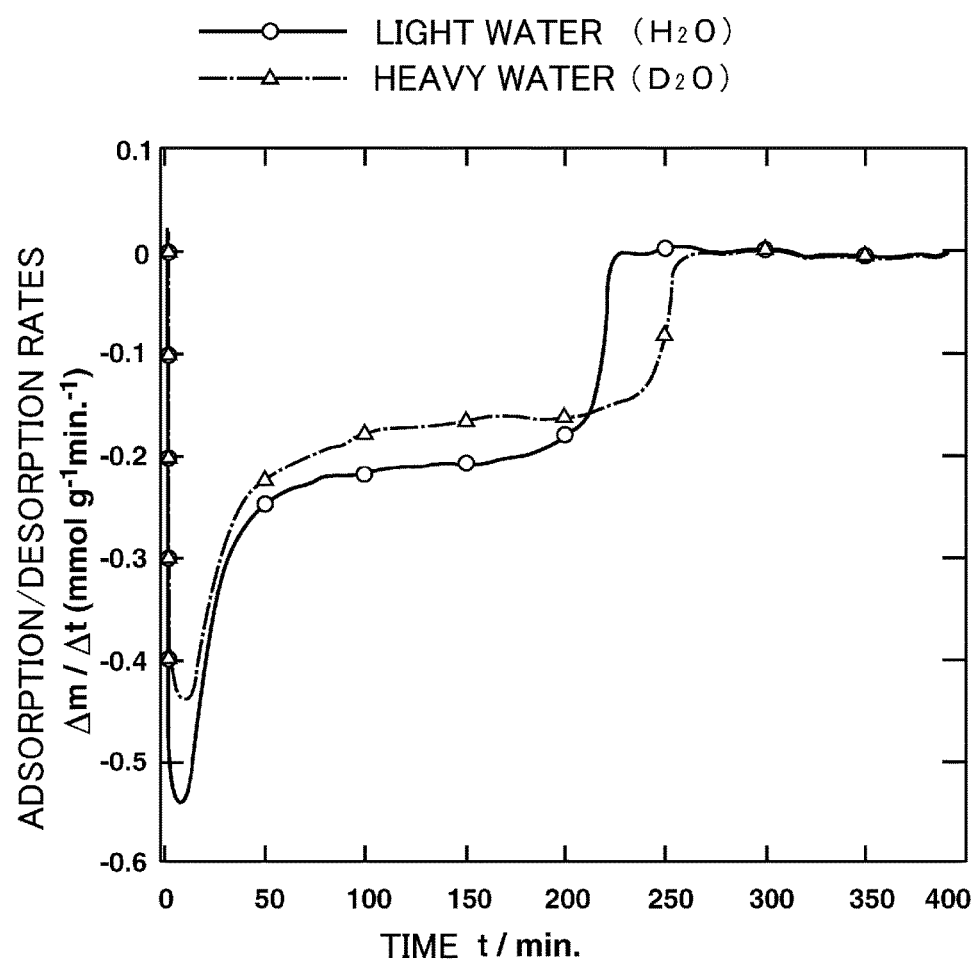
FIG. 3 is a graph illustrating the desorption rates of the light water and the heavy water with respect to the adsorbent.

The graph in FIG. 3 illustrates the result. In the graph in FIG. 3, the adsorption/desorption rates are taken along the ordinate. Accordingly, a larger negative value in the ordinate represents a higher desorption rate.

As illustrated in FIG. 3, the desorption rate of the light water is extremely high and greatly exceeds the desorption rate of the heavy water for about 10 minutes after the start of supply of the mixed gas with the humidity of 40% (0 minute).

From 10 minutes to 200 minutes, the desorption rate of the light water is moderate and exceeds the desorption rate of the heavy water, having a slight difference.

After 200 minutes, the desorption rate of the light water drops sharply and falls below the desorption rate of the heavy water.

The light water reaches equilibrium in approximately 220 minutes, and the heavy water reaches equilibrium in approximately 250 minutes.

Note that the desorption rate of the semi-heavy water is also considered to be a mean value of the desorption rates of the light water and the heavy water.

First Embodiment

In a first embodiment, utilizing the first 10 minutes with a high desorption rate, deuterium depleted water is obtained.

Figure 4:
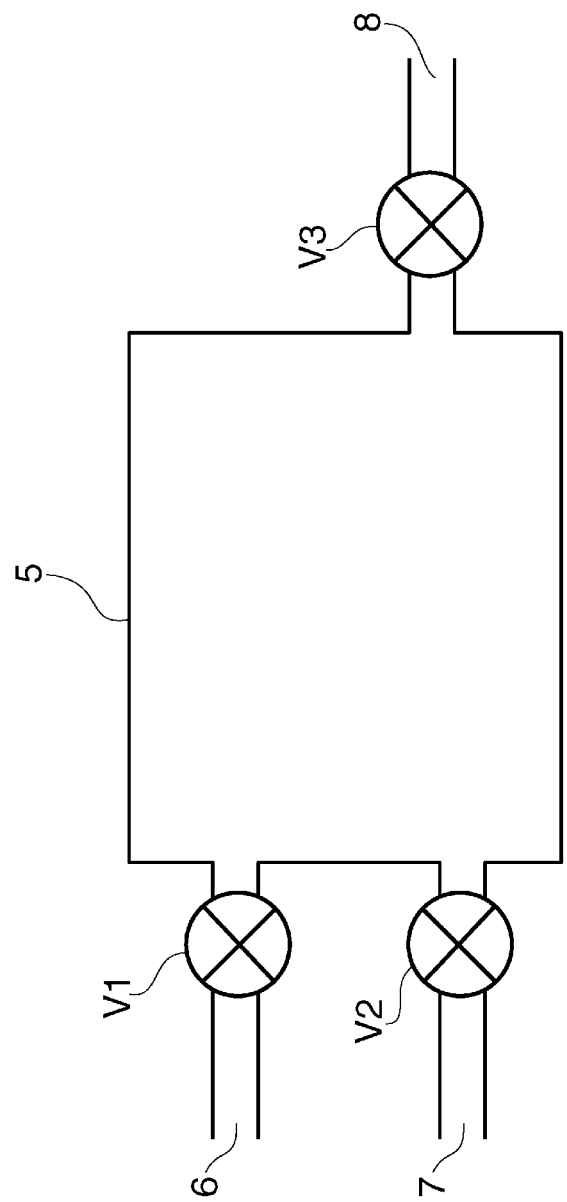
FIG. 4 is a view illustrating an adsorption tower used in a first embodiment of the present invention.

An adsorbent containing activated carbon (not illustrated) is disposed in an adsorption tower 5, illustrated in FIG. 4, used in the first embodiment. The adsorption tower 5 is formed with an inlet 6 for water vapor and dry air; a vent port 7 for deuterium depleted water; and a recovery port 8. The inlet 6, vent port 7, and recovery port 8 are provided with valves V1, V2, and V3, respectively.

In the first embodiment, first, the valve V1 and the valve V2 are opened with the valve V3 kept closed, and water vapor is allowed to flow from the inlet 6 to the adsorption tower 5 so that the adsorbent 4 adsorbs the water vapor until reaching saturation.

Next, water vapor is desorbed from the adsorbent 4.

In order to desorb water vapor from the adsorbent 4, a relative pressure (adsorption equilibrium pressure/saturation water vapor pressure) of water vapor around the adsorbent is reduced. Exemplary methods for reducing the relative pressure include depressurizing, flowing dry gas, and raising a temperature. For example, what is devised in the embodiment illustrated in FIG. 1 is to supply only dry nitrogen gas, but the method for reducing the relative pressure of the water vapor is not limited thereto.

Next, the valve V2 is closed and the valves V1, V3 are opened, and dry air with a humidity of 0% is supplied from the inlet 6 for 10 minutes so as to recover the water vapor from the recovery port 8.

In the present embodiment, the relative pressure (adsorption equilibrium pressure/saturation water vapor pressure) of the water vapor supplied to the adsorption tower in an adsorption process is 0.9, and the relative pressure of the dry air supplied in a desorption process is 0.4. It should be noted that conditions such as numerical values of the relative pressure in each process are not limited to those in the embodiment, and may vary depending on other conditions such as types of the adsorbent.

In 10 minutes from the start of desorption, a mean desorption rate of light water is 0.53 mmol/min, a mean desorption rate of semi-heavy water is 0.47 mmol/min at a calculated value, and a mean desorption rate of heavy water is 0.42 mmol/min.

In the first embodiment, 74 mg of water vapor can be recovered from the recovery port 8 per 1 gram of the water vapor adsorbed by the adsorbent. Typically, a deuterium concentration (concentration of heavy water and semi-heavy water) of water vapor to be supplied to the adsorption tower is 150 ppm. However, a deuterium concentration of the water vapor recovered from the recovery port 8 is reduced to 135 ppm.

Then, the valve V3 is closed, and the valves V1, V2 are opened, and dry air is supplied so as to eliminate water vapor remaining in the adsorption tower from the vent port 7.

In such manners, in the first embodiment, it is possible to efficiently produce deuterium depleted water (water vapor) with a reduced deuterium concentration in a short time.

Second Embodiment

In a second embodiment, seeing the processes in the first embodiment as one cycle, the cycle is repeated more than once.

First, the processes in the first embodiment are carried out so as to recover water vapor from the recovery port 8, and to eliminate water vapor remaining in the adsorption tower 5 from the vent port 7 (the first cycle).

Next, the recovered water vapor is reintroduced from the inlet 6, and the adsorbent is allowed to adsorb the water vapor until reaching saturation. Then, dry air is supplied for 10 minutes to recover the water vapor from the recovery port 8. Thereafter, water vapor remaining in the adsorption tower 5 is eliminated from the vent port 7 (the second cycle).

These processes are repeated until the fifth cycle.

The left column of FIG. 5 illustrates a deuterium concentration in each cycle of water vapor to be recovered from the recovery port 8, and a quantity in each cycle of water vapor to be recovered per 1 gram of water vapor supplied in the first cycle.

In the fifth cycle, a deuterium concentration of water vapor recovered from the recovery port 8 is 88 ppm. Furthermore, in the fifth cycle, 2.2 µg of water vapor can be recovered from the recovery port 8 per 1 gram of the water vapor supplied in the first cycle.

The right column of FIG. 5 illustrates a deuterium concentration in each cycle of water vapor to be discarded from the vent port 7, and a quantity in each cycle of water vapor to be discarded per 1 gram of the water vapor supplied in the first cycle.

In the second embodiment, it is possible to efficiently produce deuterium depleted water (water vapor) with a further reduced deuterium concentration in a short time.

Third Embodiment

In a third embodiment, used is a device in which five adsorption towers each containing an adsorbent are connected in series.

Figure 6:
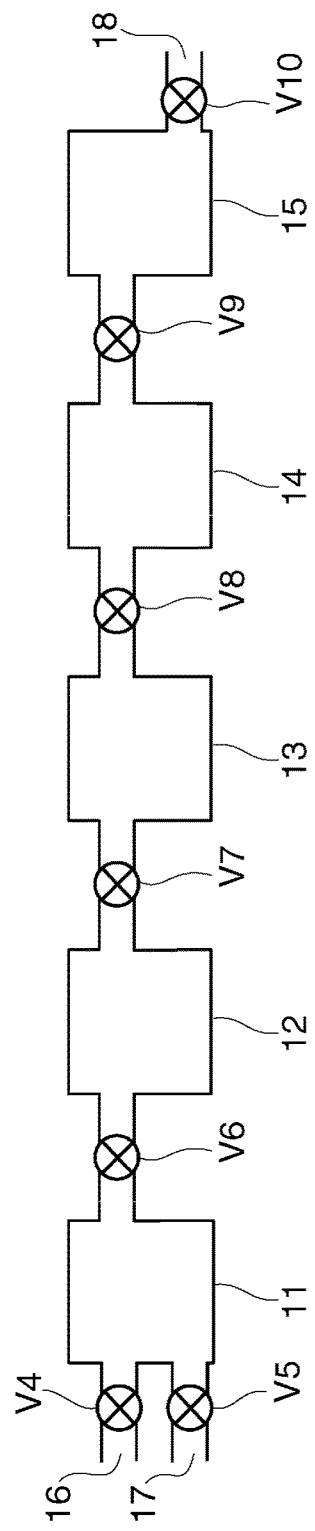
FIG. 6 is a view illustrating a device used in a third embodiment of the present invention.

In this device, five adsorption towers from a first tower 11 to a fifth tower 15 are connected in series with connecting pipes as illustrated in FIG. 6.

The first tower 11 is formed with an inlet 16, and a vent port 17. The fifth tower 15 is formed with a recovery port 18.

The inlet 16, the vent port 17, the connecting pipes connecting the adsorption towers, and the recovery port 18 are provided with valves V4, V5, V6, V7, V8, V9, and V10.

If required, each adsorption tower may be provided with an inlet, and a vent port.

In this device, in advance, an adsorbent of the first tower 11 is allowed to adsorb water vapor having a deuterium concentration of 150 ppm, an adsorbent of the second tower 12 is allowed to adsorb water vapor having a deuterium concentration of 135 ppm, an adsorbent of the third tower 13 is allowed to adsorb water vapor having a deuterium concentration of 121 ppm, an adsorbent of the fourth tower 14 is allowed to adsorb water vapor having a deuterium concentration of 109 ppm, and an adsorbent of the fifth tower 15 is allowed to adsorb water vapor having a deuterium concentration of 98 ppm. Each adsorbent is allowed to adsorb the aforementioned water vapor at a relative pressure of 0.9 until reaching saturation.

In the third embodiment, first, only the valve V10 of the recovery port 18 is opened, and the relative pressure of the fifth tower 15 is reduced to 0.4 so as to recover the water vapor desorbed from the adsorbent for 10 minutes. Then, the valve V10 is closed.

Next, the valve V9 is opened, and the relative pressure of the fourth tower 14 is reduced to 0.4 so as to transfer the water vapor desorbed from the adsorbent to the fifth tower 15 for 10 minutes. Then, the valve V9 is closed.

Subsequently, the valve V8 is opened, and the relative pressure of the third tower 13 is reduced to 0.4 so as to transfer the water vapor desorbed from the adsorbent to the fourth tower 14 for 10 minutes. Then, the valve V8 is closed.

Next, the valve V7 is opened, and the relative pressure of the second tower 12 is reduced to 0.4 so as to transfer the water vapor desorbed from the adsorbent to the third tower 13 for 10 minutes. Then, the valve V7 is closed.

Subsequently, the valve V6 is opened, and the relative pressure of the first tower 11 is reduced to 0.4 so as to transfer the water vapor desorbed from the adsorbent to the second tower 12 for 10 minutes. Then, the valve V6 is closed.

Next, the valve V5 is opened, and the water vapor remaining inside the first tower 11 is eliminated from the vent port 17. Subsequently, the valve V4 is opened to introduce 150 ppm of water vapor from the inlet 16, causing the adsorbent to adsorb the water vapor at the relative pressure of 0.9. Then, the valves V4, V5 are closed.

Seeing these processes as one cycle, the cycle is repeated more than once.

The table in FIG. 7 illustrates a deuterium concentration of the water vapor desorbed from the adsorbent of each adsorption tower at the first cycle, second cycle, third cycle, and fifteenth cycle. The table also illustrates a deuterium concentration of the water vapor remaining in the adsorbent of each adsorption tower at the twelfth cycle.

In the third embodiment, the processes are repeated till the fifteenth cycle so that it is possible to obtain a large quantity of water vapor with a deuterium concentration of 100 ppm or less in a short time.

It should be noted that the process of recovering the water vapor from the fifth tower 15, the process of transferring the water vapor from the third tower 13 to the fourth tower 14, and the process of transferring the water vapor from the first tower 11 to the second tower 12 may be carried out simultaneously, and then, the process of transferring the water vapor from the fourth tower 14 to the fifth tower 15, the process of transferring the water vapor from the second tower 12 to the third tower 13, and the process of replacing the water vapor of the first tower 11 may be carried out simultaneously so as to shorten the time taken for one cycle to two processes.

When the twelfth cycle is completed, the water vapor remaining inside the first tower 11 is eliminated from the vent port 17, the water vapor remaining in the second tower 12 is transferred to the first tower 11, the water vapor remaining in the third tower 13 is transferred to the second tower 12, the water vapor remaining in the fourth tower 14 is transferred to the third tower 13, the water vapor remaining in the fifth tower 15 is transferred to the fourth tower 14, and the water vapor with a deuterium concentration of 98 ppm is supplied to the fifth tower. Accordingly, the deuterium concentration of the water vapor in each adsorption tower can be returned to almost the same level as before the start of the first cycle.

Therefore, it is possible to efficiently repeat the processes from the first cycle to the twelfth cycle.

In the third embodiment, it is possible to efficiently produce deuterium depleted water (water vapor) with a further reduced deuterium concentration in a shorter time.

It is also possible to obtain, from the fifth tower 15, almost the same quantity of deuterium depleted water (water vapor) as the water vapor introduced into the first tower 11, which improves productivity.

Furthermore, the water vapor remaining in each adsorption tower can be recycled to repeat the cycle so that it is possible to further improve the productivity.

Fourth Embodiment

In the fourth embodiment, used is a device in which five adsorption towers each containing an adsorbent are connected in series and in an annular shape.

Figure 8:
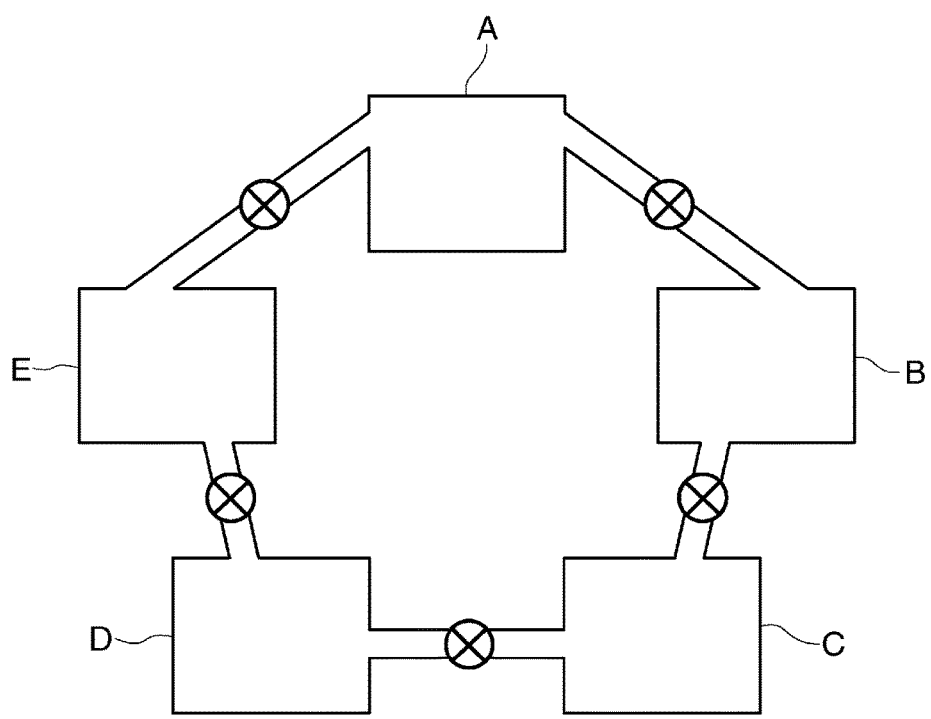
FIG. 8 is a view illustrating a device used in a fourth embodiment of the present invention.

In this device, five adsorption towers from an adsorption tower A to an adsorption tower E are connected in series and in an annular shape with connecting pipes as illustrated in FIG. 8.

Each of the adsorption towers A, B, C, D and E is formed with an inlet, a vent port, and a recovery port, all of which are not illustrated.

Each of the inlet port, the vent port, the connecting pipes connecting the adsorption towers, and the recovery port is provided with a valve.

In the fourth embodiment, first, the first cycle to the twelfth cycle in the third embodiment are carried out, considering the adsorption towers A, B, C, D, and E as the first tower 11, second tower 12, third tower 13, fourth tower 14, and fifth tower 15 of the third embodiment, respectively.

Next, water vapor remaining in the adsorption tower A corresponding to the first tower 11 is eliminated from the vent port, and 98 ppm of water vapor is supplied from the inlet so as to allow the adsorbent to adsorb the water vapor until reaching saturation.

Subsequently, the first cycle to the twelfth cycle in the third embodiment are carried out, considering the adsorption towers B, C, D, E, and A as the first tower 11, second tower 12, third tower 13, fourth tower 14, and fifth tower 15 of the third embodiment, respectively.

In such manners, a role of the adsorption tower A is changed every twelve cycles so that the adsorption tower A serves as the first tower 11, fifth tower 15, fourth tower 14, third tower 13, second tower 12, first tower 11 . . . in order. Roles of the other adsorption towers B to E are also changed, being associated with this order.

In the fourth embodiment, compared to the third embodiment, the water vapor remaining in each adsorption tower can be reused without transferring. Therefore, it is possible to save the time and power required for transferring the water vapor and to produce deuterium depleted water in a shorter time at low cost.

Fifth Embodiment

In a fifth embodiment, what is utilized is a period of time from 10 minutes after the start of desorption to 200 minutes, in the graph of FIG. 3, when a desorption rate of light water is moderate, exceeding a desorption rate of heavy water.

In other words, the time for recovering water vapor from the recovery port 8 in the first embodiment is changed to 100 minutes from the start of introduction of dry air and desorption of the water vapor from an adsorbent.

In the fifth embodiment, first, the valves V1, V2 are opened with the valve V3 kept closed in the adsorption tower 5 of FIG. 4. Then, water vapor is allowed to flow from the inlet 6 to the adsorption tower 5, and the adsorbent is allowed to adsorb the water vapor until reaching saturation.

Next, the valve V2 is closed and the valves V1, V3 are opened, and dry air with a humidity of 0% is supplied from the inlet 6 for 100 minutes so as to recover the water vapor from the recovery port 8.

A relative pressure of the water vapor supplied to the adsorption tower 5 and a relative pressure of the dry air are similar to those in the first embodiment.

In 100 minutes from the start of desorption, a mean desorption rate of light water is 0.21 mmol/min, a mean desorption rate of semi-heavy water is 0.19 mmol/min at a calculated value, and a mean desorption rate of heavy water is 0.17 mmol/min.

In the fifth embodiment, it is possible to recover 333 mg of water vapor from the recovery port 8 per 1 gram of the water vapor adsorbed in the adsorption tower 5. Typically, a deuterium concentration (concentration of heavy water and semi-heavy water) of water vapor to be supplied to the adsorption tower 5 is 150 ppm. However, a deuterium concentration of the water vapor recovered from the recovery port 8 is reduced to 136 ppm.

Subsequently, the valve V3 is closed, and the valves V1, V2 are opened, and dry air is supplied so that water vapor remaining inside the adsorption tower 5 can be eliminated.

In such manners, even in the fifth embodiment, it is possible to efficiently produce deuterium depleted water (water vapor) with a reduced deuterium concentration in a short time.

Sixth Embodiment

In a sixth embodiment, the time for recovering water vapor from the recovery port 8 in the second embodiment is changed to 100 minutes from the start of introduction of dry air and desorption of the water vapor from an adsorbent.

First, the processes in the fifth embodiment are carried out so as to recover water vapor from the recovery port 8, and to eliminate water vapor remaining in the adsorption tower 5 from the vent port (the first cycle).

Next, the recovered water vapor is introduced from the inlet 6, and the adsorbent is allowed to adsorb the water vapor until reaching saturation. Then, dry air is supplied for 100 minutes to recover the water vapor from the recovery port 8. Thereafter, water vapor remaining in the adsorption tower 5 is eliminated from the vent port 7 (the second cycle). These processes are repeated until the fifth cycle.

The left column of FIG. 9 illustrates a deuterium concentration in each cycle of water vapor to be recovered from the recovery port 8, and a quantity in each cycle of water vapor to be recovered per 1 gram of water vapor supplied in the first cycle.

In the fifth cycle, a deuterium concentration of water vapor recovered from the recovery port 8 is 91 ppm. Furthermore, in the fifth cycle, 4.1 mg of water vapor can be recovered from the recovery port 8 per 1 gram of the water vapor supplied in the first cycle.

The right column of FIG. 9 illustrates a deuterium concentration in each cycle of water vapor to be discarded from the vent port 7, and a quantity in each cycle of water vapor to be discarded per 1 gram of the water vapor supplied in the first cycle.

In the sixth embodiment, it is possible to efficiently produce deuterium depleted water (water vapor) with a further reduced deuterium concentration in a short time.

Seventh Embodiment

In a seventh embodiment, the time for recovering water vapor from the recovery port 18 in the third embodiment is changed to 100 minutes from the start of introduction of dry air and desorption of the water vapor from an adsorbent.

In the seventh embodiment, in a device illustrated in FIG. 6, in advance, an adsorbent of the first tower 11 is allowed to adsorb water vapor having a deuterium concentration of 150 ppm, an adsorbent of the second tower 12 is allowed to adsorb water vapor having a deuterium concentration of 136 ppm, an adsorbent of the third tower 13 is allowed to adsorb water vapor having a deuterium concentration of 123 ppm, an adsorbent of the fourth tower 14 is allowed to adsorb water vapor having a deuterium concentration of 111 ppm, and an adsorbent of the fifth tower 15 is allowed to adsorb water vapor having a deuterium concentration of 101 ppm. Each adsorbent is allowed to adsorb the aforementioned water vapor at a relative pressure of 0.9 until reaching saturation.

In the seventh embodiment, first, only the valve V10 of the recovery port 18 is opened, and the relative pressure of the fifth tower 15 is reduced to 0.4 so as to recover the water vapor desorbed from the adsorbent for 100 minutes. Then, the valve V10 is closed.

Next, the valve V9 is opened, and the relative pressure of the fourth tower 14 is reduced to 0.4 so as to transfer the water vapor desorbed from the adsorbent to the fifth tower 15 for 100 minutes. Then, the valve V9 is closed.

Subsequently, the valve V8 is opened, and the relative pressure of the third tower 13 is reduced to 0.4 so as to transfer the water vapor desorbed from the adsorbent to the fourth tower 14 for 100 minutes. Then, the valve V8 is closed.

Next, the valve V7 is opened, and the relative pressure of the second tower 12 is reduced to 0.4 so as to transfer the water vapor desorbed from the adsorbent to the third tower 13 for 100 minutes. Then, the valve V7 is closed.

Subsequently, the valve V6 is opened, and the relative pressure of the first tower 11 is reduced to 0.4 so as to transfer the water vapor desorbed from the adsorbent to the second tower 12 for 100 minutes. Then, the valve V6 is closed.

Next, the valve V5 is opened, and the water vapor remaining inside the first tower 11 is eliminated from the vent port 17. Subsequently, the valve V4 is opened to introduce 150 ppm of water vapor from the inlet 16, causing the adsorbent to adsorb the water vapor at the relative pressure of 0.9. Then, the valves V4, V5 are closed.

Seeing these processes as one cycle, the cycle is repeated more than once.

The table in FIG. 10 illustrates a deuterium concentration of the water vapor desorbed from the adsorbent of each adsorption tower at the first cycle, second cycle, and third cycle. The table also illustrates a deuterium concentration of the water vapor remaining in the adsorbent of each adsorption tower at the third cycle.

In the seventh embodiment, the processes are repeated till the third cycle so that it is possible to obtain a large quantity of water vapor with a mean deuterium concentration of 100 ppm or less in a short time.

It should be noted that the process of recovering the water vapor from the fifth tower 15, the process of transferring the water vapor from the third tower 13 to the fourth tower 14, and the process of transferring the water vapor from the first tower 11 to the second tower 12 may be carried out simultaneously, and then, the process of transferring the water vapor from the fourth tower 14 to the fifth tower 15, the process of transferring the water vapor from the second tower 12 to the third tower 13, and the process of replacing the water vapor of the first tower 11 may be carried out simultaneously so as to shorten the time taken for one cycle to two processes.

When the second cycle is completed, the water vapor remaining inside the first tower 11 is eliminated from the vent port 17, the water vapor remaining in the second tower 12 is transferred to the first tower 11, the water vapor remaining in the third tower 13 is transferred to the second tower 12, the water vapor remaining in the fourth tower 14 is transferred to the third tower 13, the water vapor remaining in the fifth tower 15 is transferred to the fourth tower 14, and the water vapor with a deuterium concentration of 101 ppm is supplied to the fifth tower. Accordingly, the deuterium concentration of the water vapor in each adsorption tower can be returned to almost the same level as before the start of the first cycle.

Therefore, it is possible to efficiently repeat the processes from the first cycle to the second cycle.

In the seventh embodiment, it is possible to efficiently produce deuterium depleted water (water vapor) with a further reduced deuterium concentration in a shorter time.

It is also possible to obtain, from the fifth tower, almost the same quantity of deuterium depleted water (water vapor) as the water vapor introduced into the first tower, which improves productivity.

Furthermore, the water vapor remaining in each adsorption tower can be recycled to repeat the cycle so that it is possible to further improve the productivity.

Eighth Embodiment

In an eighth embodiment, the time for recovering water vapor from the recovery port in the fourth embodiment is changed to 100 minutes from the start of introduction of dry air and desorption of the water vapor from an adsorbent.

In the eighth embodiment, in a device illustrated in FIG. 8, first, the first cycle to the third cycle in the seventh embodiment are carried out, considering the adsorption towers A, B, C, D, and E as the first tower 11, second tower 12, third tower 13, fourth tower 14, and fifth tower 15 of the seventh embodiment, respectively.

Next, water vapor remaining in the adsorption tower A corresponding to the first tower 11 is eliminated from vent port, and 101 ppm of water vapor is supplied from an inlet port so as to be attached to the adsorbent.

Subsequently, the first cycle to the third cycle in the seventh embodiment are carried out, considering the adsorption towers B, C, D, E, and A as the first tower 11, second tower 12, third tower 13, fourth tower 14, and fifth tower 15 of the seventh embodiment, respectively.

In such manners, a role of the adsorption tower A is changed every three cycles so that the adsorption tower A serves as the first tower 11, fifth tower 15, fourth tower 14, third tower 13, second tower 12, first tower 11 . . . in order. Roles of the other adsorption towers B to E are also changed, being associated with this order.

In the eighth embodiment, compared to the seventh embodiment, the water vapor remaining in each adsorption tower can be reused without transferring. Therefore, it is possible to save the time and power required for transferring the water vapor and to produce deuterium depleted water in a shorter time at low cost.

Ninth Embodiment

In a ninth embodiment, utilizing the first 10 minutes with a high adsorption rate, deuterium depleted water is obtained.

Even in the ninth embodiment, the adsorption tower 5 used in the first embodiment is used.

In the ninth embodiment, first, valves V1, V2 are opened with a valve V3 kept closed, and dry air having a relative pressure of 0.4 is introduced from an inlet 6 to the adsorption tower 5 so as to keep an adsorbent dry.

Next, water vapor having a relative pressure of 0.9 is flowed through the inlet 6 into the adsorption tower 5, and the adsorbent is allowed to adsorb the water vapor for 10 minutes.

Subsequently, a surface of the adsorbent is covered with a cover and the like to block the water vapor adsorbed by the adsorbent and water vapor in the air. Then, the water vapor in the air is eliminated from a vent port 7.

Next, the cover and the like are removed from the adsorbent, the valve V2 is closed, and the valves V1, V3 are opened so as to flow dry air from the inlet 6 and to recover the water vapor adsorbed by the adsorbent from a recovery port 8.

In such manners, even in the ninth embodiment, it is possible to efficiently produce deuterium depleted water (water vapor) with a reduced deuterium concentration in a short time.

Even in utilizing a difference in adsorption rate as in the ninth embodiment, the time for allowing the adsorbent to adsorb the water vapor may be changed to 50 minutes or 100 minutes.

The processes in the ninth embodiment may be repeated more than once to further reduce a deuterium concentration of the water vapor.

Furthermore, deuterium depleted water may be produced by using a device in which adsorption towers are connected in series as in the third embodiment, or a device in which adsorption towers are connected in series and in an annular shape as in the fourth embodiment.

Note that each "valve" used in the first embodiment to ninth embodiment may be replaced by "a pump" or "a valve and a pump" as necessary.

Using a valve prevents a reverse flow of water vapor or dry air, and using a pump speeds up transfer of water vapor or dry air so that it is most preferable to use a valve and a pump in combination.

In the first embodiment to the eighth embodiment, water vapor is desorbed from the adsorbent and recovered only when the desorption rate of the light water>the desorption rate of the heavy water and semi-heavy water. However, in a case where a sum from the start of desorption is the desorption rate of the light water>the desorption rate of the heavy water and semi-heavy water, a part of the desorption process may include a period of time when the desorption rate of the light water≤the desorption rate of the heavy water and semi-heavy water.

Furthermore, in the ninth embodiment, the adsorbent is allowed to adsorb and recover the water vapor only when the adsorption rate of the light water>the adsorption rate of the heavy water and semi-heavy water. However, in a case where a sum from the start of adsorption is the adsorption rate of the light water>the adsorption rate of the heavy water and semi-heavy water, a part of the adsorption process may include a period of time when the adsorption rate of the light water≤the adsorption rate of the heavy water and semi-heavy water.

Even in these modifications, it is possible to produce water having a deuterium concentration lower than that of commonly used water.

In the first embodiment to the ninth embodiment, water vapor having a deuterium concentration exceeding 150 ppm is discarded, but this deuterium concentrated water may be recovered and used for purposes requiring heavy water or semi-heavy water.

Furthermore, in regard to an adsorbent other than the adsorbent illustrated above, an adsorption rate and a desorption rate of water vapor may be measured by the aforementioned method. Based on these measured rates, the method for producing deuterium depleted water according to the first embodiment and the ninth embodiment may be applied.

REFERENCE SIGNS LIST

1 MEASUREMENT DEVICE
2 WATER
3 TEST TUBE
4 ADSORBENT
5, A, B, C, D, E ADSORPTION TOWER
6, 16 INLET
7, 17 VENT PORT
8, 18 RECOVERY PORT
11 FIRST TOWER
12 SECOND TOWER
13 THIRD TOWER
14 FOURTH TOWER
15 FIFTH TOWER
V1, V2, . . . , V10 VALVE

The invention claimed is:

1. A method for producing deuterium depleted water by removing heavy water and semi-heavy water from water, the method comprising:
a desorption process in which a relative pressure of water vapor around a predetermined adsorbent with adsorbed water vapor is reduced, and in which water vapor desorbed from the adsorbent, having a deuterium concentration lower than water vapor adsorbed by the adsorbent is recovered during a period of time when a desorption rate of light water>a desorption rate of the heavy water and semi-heavy water.

2. A method for producing deuterium depleted water by removing heavy water and semi-heavy water from water, the method comprising:
a desorption process in which a relative pressure of water vapor around a predetermined adsorbent with adsorbed water vapor is reduced, and in which water vapor desorbed from the adsorbent, having a deuterium concentration lower than water vapor adsorbed by the adsorbent is recovered only during a period of time when a desorption rate of light water>a desorption rate of the heavy water and semi-heavy water.

3. A method for producing deuterium depleted water by removing heavy water and semi-heavy water from water according to claim 1, the method comprising:
a desorption process in an upper stream in which two or more predetermined adsorbents are arranged in series in advance so as to reduce a relative pressure of water vapor around the adsorbent in the upper stream with adsorbed water vapor and to recover water vapor desorbed from the adsorbent in the upper stream during a period of time when a desorption rate of light water>a desorption rate of the heavy water and semi-heavy water; and
a desorption process in a lower stream in which the adsorbent in the lower stream is allowed to adsorb the recovered water vapor so as to reduce a relative pressure of water vapor around the adsorbent in the lower stream and to recover water vapor desorbed from the adsorbent in the lower stream during the period of time when the desorption rate of the light water>the desorption rate of the heavy water and semi-heavy water.

4. A method for separating water into light water, heavy water, and semi-heavy water, the method comprising:
reducing a relative pressure of water vapor around a predetermined adsorbent with adsorbed water vapor; and
desorbing, from the adsorbent, water vapor having a deuterium concentration lower than water vapor adsorbed by the adsorbent during a period of time when a desorption rate of the light water>a desorption rate of the heavy water and semi-heavy water.

5. A method for producing deuterium concentrated water by removing light water from water, the method comprising:
a desorption process in which a relative pressure of water vapor around a predetermined adsorbent with adsorbed water vapor is reduced, and in which water vapor having a deuterium concentration lower than water vapor adsorbed by the adsorbent is desorbed from the adsorbent during a period of time when a desorption rate of the light water>a desorption rate of heavy water and semi-heavy water, thereafter recovering water remaining in the adsorbent and having a deuterium concentration higher than the water vapor adsorbed by the adsorbent.

* * * * *